J. G. TIBBETT.
ANTIFRICTION ROLLER.
No. 1,254. Patented July 22, 1839.
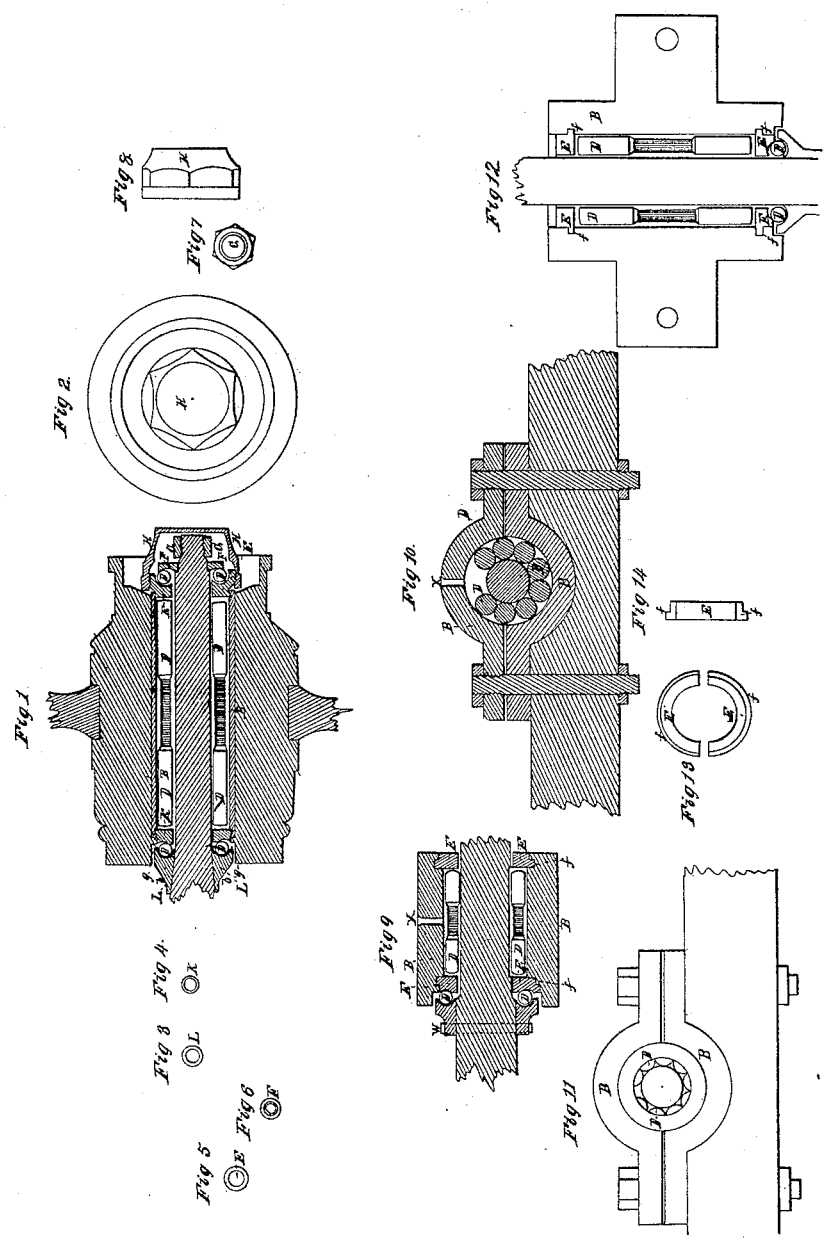

UNITED STATES PATENT OFFICE.

JOHN G. TIBBETS, OF NEW YORK, N. Y.

IMPROVEMENT IN THE MODE OF APPLYING ANTI-FRICTION ROLLERS AND BALLS TO THE AXLES AND BOXES OF CARRIAGE-WHEELS, &c.

Specification forming part of Letters Patent No. 1,254, dated July 22, 1839.

*To all whom it may concern:*

Be it known that I, JOHN G. TIBBETS, of the city, county, and State of New York, have invented a new and useful Mode of Applying Rollers Around Axles and Balls at the Ends and Shoulders Thereof for Reducing Friction, which is described as follows, reference being had to the annexed drawings of the same, making part of this specification.

Of a hub, Figure 1 represents a horizontal longitudinal section of a hub and axle-tree with rollers, balls, and rings arranged around it and screw-cap over the end; Fig. 2, an end view of the hub; Fig. 3, a plan of concave circular shoulder; Fig. 4, a plan of dovetailed shoulder-ring; Fig. 5, a plan of dovetailed screw-ring; Fig. 6, a plan of slot-washer; Fig. 7, a nut; Fig. 8, a screw-cap to retain the oil and keep out dust.

Of a segment-box and journal, Fig. 9 represents a vertical longitudinal section of box, journal, rollers, rings, and balls; Fig. 10, an end view of segment-box, axle, and rollers, the flanged ring being removed; Fig. 11, an end of the same, the flanged ring being in its proper place. Fig. 12 represents a horizontal section of the segment-box, axle, rollers, rings, balls, &c.; Fig. 13, a front view of flanged ring in segments; Fig. 14, a section of the same.

*First, of the hub and axle-tree.*—The hub, axle-tree, spokes, and screw-cap are made in the usual manner. The improvement consists in a certain arrangement of rollers, balls, rings, &c., around the axle-tree inside the box as greatly to reduce friction. The inside of the pipe-box B of the hub must be perfectly cylindrical and turned smooth, having dovetailed grooves *g* near each end inside. This box must be heated, so as to expand it sufficiently to admit dovetailed edges of rings B K at each end in a cold state, which the box closes upon as it contracts in cooling, and thus unites the box and rings firmly together, and forms rims around the inside of the box to hold the rollers in their proper positions, and also forms concave shoulders to admit balls to reduce the friction at the ends of the box. The sides of these rings toward the rollers are made flat and smooth. The opposite sides are made concave to admit the balls, which are contained between said rings and the concave shoulder L and concave slot-washer F. The dovetail ring E has a male screw cut on its outside, on which is screwed the screw-cap H for holding oil and keeping out dirt. The concave circular shoulder L is made beveling on the outside at *b*, over which the sand-ring of the hub projects for keeping out dirt. It is either welded to the axle-tree or put on separately. The balls are made of iron or steel. The slot-washer F is made concave on the side toward the rollers and flat on the opposite side. Its use does away with the necessity of having right and left hand nuts, and enables the use of right-hand screw-nuts altogether. The nuts G are made in the usual manner. The rollers D should be turned true, of the same diameter at each end, but smaller about one-third of the length at the middle to make room for oil, with which they and the balls, &c., should be kept well lubricated. The lengths of the rollers should be three times the diameter of the axle-tree. These rollers cannot be well applied to separate boxes in each end of the hub, but are particularly applicable to the before-described pipe-box.

*Second, the segment-box and journal.*—This box is made in two parts B B, each a semicircle, with flanges perforated by which the parts are held firmly together by screw-bolts. Its diameter inside is as much greater than that of the axle to turn therein as the space required for the series of anti-friction rollers D, arranged around the axle. Near each end of the box inside is a groove to receive the flange *f* of a ring E at each end, one side of which toward the rollers being flat and the opposite or outside of the ring next the shoulder-ring being concave to admit a ball or balls between it and a concave shoulder-ring made similar to the shoulder-ring of the axle-tree before described, which shoulder-ring is secured by a key W, passing through it and the axle. The rollers are made and arranged in a similar manner to those above described.

X is an aperture or oil-hole through the box to admit oil for lubricating the interior of the box, &c.

The slot-washer F is simply a ring made concave on the side toward the balls and flat on the other side, as before described, having the opening in the center for the axle in the shape of a segment of a circle, and the part of said axle on which it is put of a corresponding shape, by which the washer is prevented from turning and unscrewing the nuts.

I do not claim the employment of rollers and balls to avoid friction in machinery; but What I do claim as my invention, and desire to secure by Letters Patent, is—

The combination of the two sets of concave flanges L and K and E and F, with the balls D working between them to prevent the balls from rubbing against the axle and box, in the manner and for the purpose herein described, and also the reducing of the diameter of the rollers at the middle to form space for oil, as herein described.

JOHN G. TIBBETS.

Witnesses:
NATHL. P. LABARTE,
JOHN MCCHESNY.